US006510378B2

(12) United States Patent
Olindo et al.

(10) Patent No.: US 6,510,378 B2
(45) Date of Patent: Jan. 21, 2003

(54) TRAFFIC CONTROL SYSTEM FOR SIGNALLING TIMELY ANY OBSTRUCTION ON THE ROAD

(76) Inventors: Regazzo Olindo, Via Gasparinetti 5, 31100 Treviso (IT); Somma Fausto, Via Torino 3, 35010 Trebaseleghe (PD) (IT)

( * ) Notice: Subject to any disclaimer, the term of this patent is extended or adjusted under 35 U.S.C. 154(b) by 0 days.

(21) Appl. No.: 09/871,490

(22) Filed: May 31, 2001

(65) Prior Publication Data

US 2002/0007245 A1 Jan. 17, 2002

(51) Int. Cl.[7] .......................................... G06F 19/00

(52) U.S. Cl. ......................... 701/117; 701/118; 342/58; 340/425.5

(58) Field of Search ................................ 701/117, 118, 701/119; 342/58; 340/425.5, 459, 463

(56) References Cited

U.S. PATENT DOCUMENTS 4,025,922 A * 5/1977 Grote .......................... 342/24
5,156,093 A * 10/1992 Azukizawa et al. ........ 104/284
5,479,358 A * 12/1995 Shimoda et al. ............ 700/291

* cited by examiner

*Primary Examiner*—Gertrude Arthur
(74) *Attorney, Agent, or Firm*—Bucknam & Archer

(57) ABSTRACT

Traffic control system for timely signalling an obstruction in the roadway as a result of accidents, traffic jams etc., in order to signal the presence of the obstruction to the arriving vehicles. The control system consists of a plurality of autonomous cooperating detecting units distributed along the road, wherein each detecting unit includes a control plant formed by a sensor of the presence of motor-vehicles, a timer unit receiving the signals provided by the sensor when the vehicles are passing and letting only a signal longer than a pre-established time to pass, in the case in which a vehicle column has been formed, and a central control unit receiving the signals from the sensor and the timer unit and adapted to control an alarm when the column is formed, and radio-transmitter units and radio-receiver units. The system is housed inside an envelope shaped preferably as a curbstone.

9 Claims, 3 Drawing Sheets

TRAFFIC CONTROL SYSTEM FOR SIGNALLING TIMELY ANY OBSTRUCTION ON THE ROAD

BACKGROUND OF THE INVENTION

The invention concerns a control system for roads and motorways adapted to signal timely to arriving motor vehicles the presence of any obstructions along the roads, which system therefore is particularly suitable in the case of accidents in fog or inside tunnels, traffic jams etc.

Those who travel by motor-vehicle know that a sudden accident or heavy traffic represents a sudden barrier in front of the motor-car in which they are travelling, thereby resulting in a sudden reduction of the available useful braking distance. Therefore it is relevant that the obstruction be timely signalled in advance. This factor is more true the more critical is the traffic, such as in the presence of fog, rain, tunnels, viaducts etc. There are known systems adapted to signal the presence of traffic jams along motorways such as lighting panels or signalling devices provided on the motorway or panels with sliding information on police cars. Still important, such means cannot be available immediately and, when they are available, the number of cars involved in the accident has already increased.

BRIEF SUMMARY OF THE INVENTION

Therefore, it is an object of the invention to provide a fully autonomous means for signalling the presence of an obstruction in as short a time as possible so as to limit the possible damage to cars already involved in the accident.

The above object is accomplished by providing a traffic control system for timely signalling the presence of an obstruction on a roadway which includes a plurality of vehicle detecting units spaced along the roadway. Each vehicle detecting unit includes a control plant having means for sensing motor vehicles on the roadway, timer means for receiving signals from the sensing means indicating the presence of motor vehicles and filtering the signals to pass only signals longer than a pre-established time, a central control unit interfaced with the timer means to receive the signals passed by the timer, alarm means actuated by the central control unit upon receipt thereby of a signal from the timer means, radio transmitter units which transmit a signal to adjacent detecting units to activate the alarm means of the adjacent detecting units upon activation by the central control unit upon receipt by the central control unit of a signal from the timer means, radio receiver units for receiving signals from adjacent detecting units so as to activate the alarm means, and an electric power source for powering the control plant.

BRIEF DESCRIPTION OF THE DRAWINGS

The invention will be better understood from the following description, given solely by way of not limiting example and with reference to the attached drawings, wherein.

DETAILED DESCRIPTION OF THE INVENTION

Figure 1:
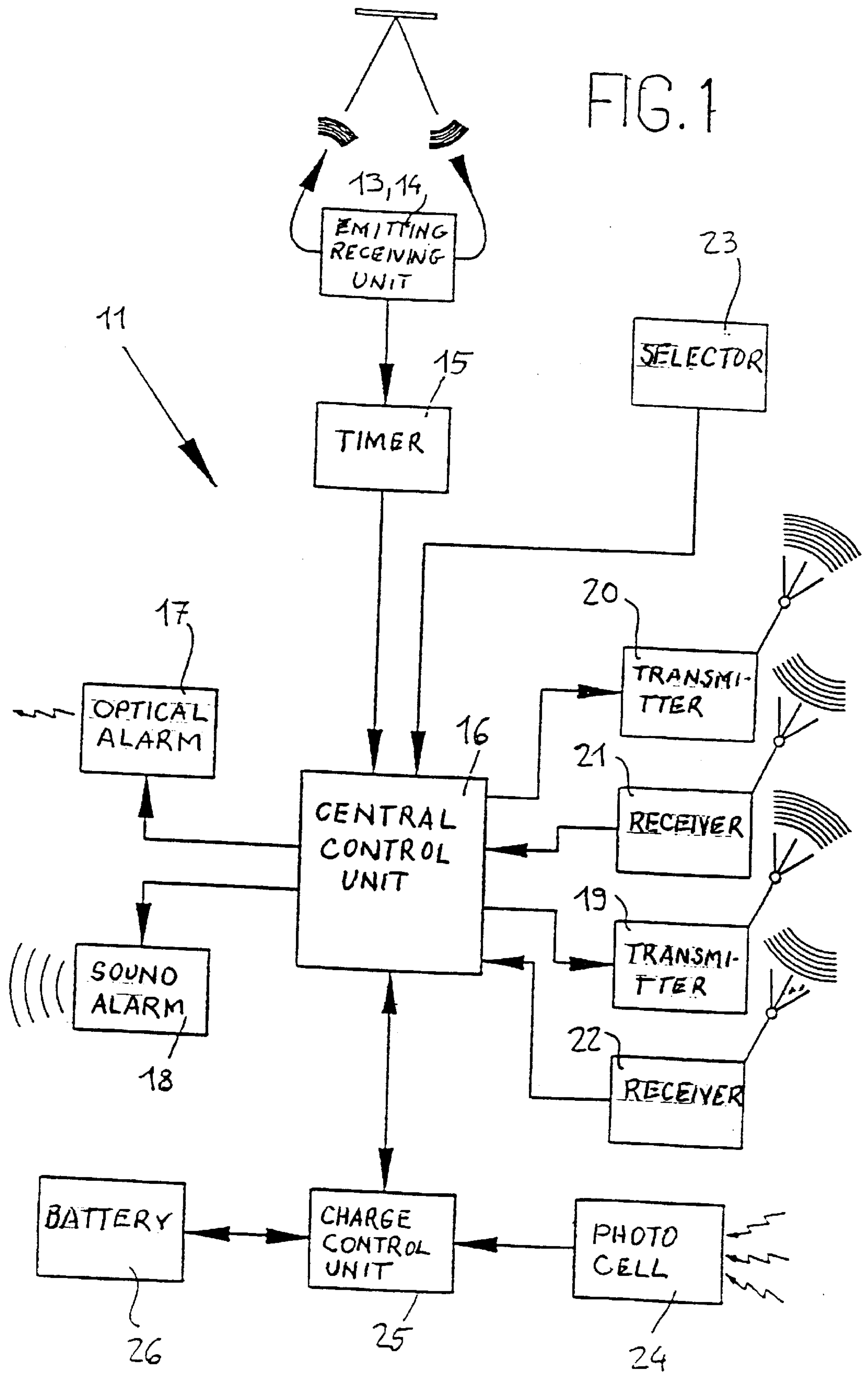
FIG. 1 is a block diagram of the component parts of the present control system.

The present invention concerns a system 8 (see FIG. 4) for timely signalling and detecting any traffic obstruction caused either by an accident or a jam of motorcars so as to establish a speed reduction on the stretch of road controlled by the system. The system 8 for detecting still cars 9 is constituted by a plurality of autonomous detecting units 10 each having an electric supply voltage therein and provided with at least a control plant 11 (see FIGS. 1 and 2) composed of a plurality of electric and electronic component parts, each of which performs a specific function and contemporaneously, by interacting both directly with the other component parts of the same control plant and with control plants 11 of other detecting units 10, signals the detected situation to cars arriving on the stretch of road, thereby allowing the timely speed reduction and/or stopping of these cars.

Figure 3:
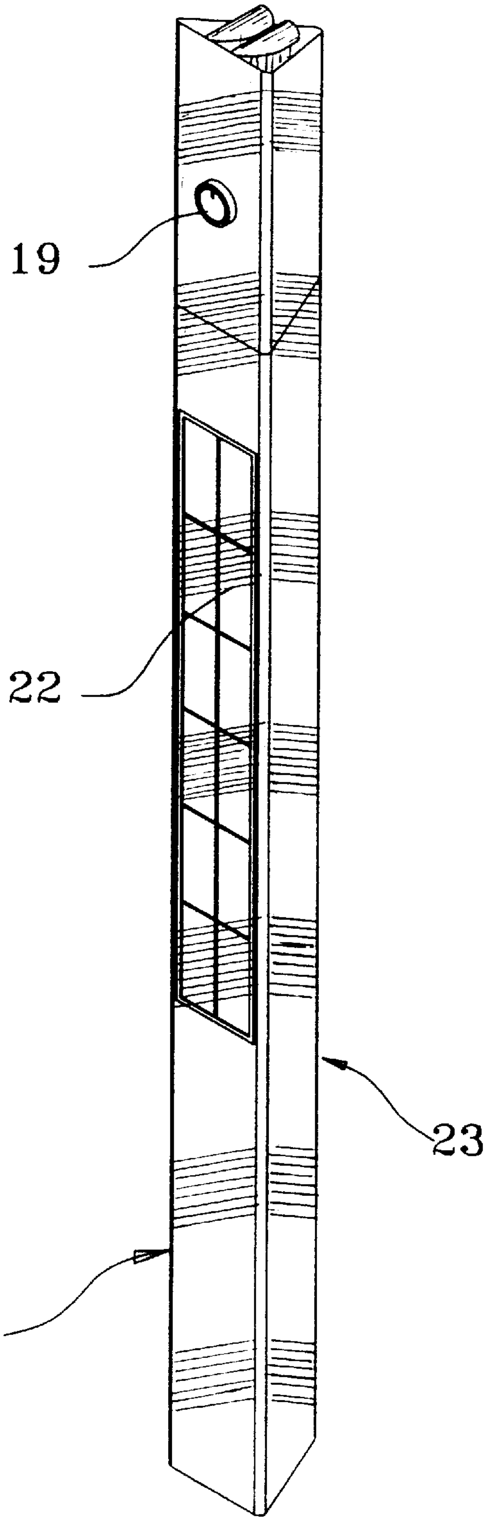
FIG. 3 is a perspective view of the rear part of the unit of FIG. 2.
Figure 4:
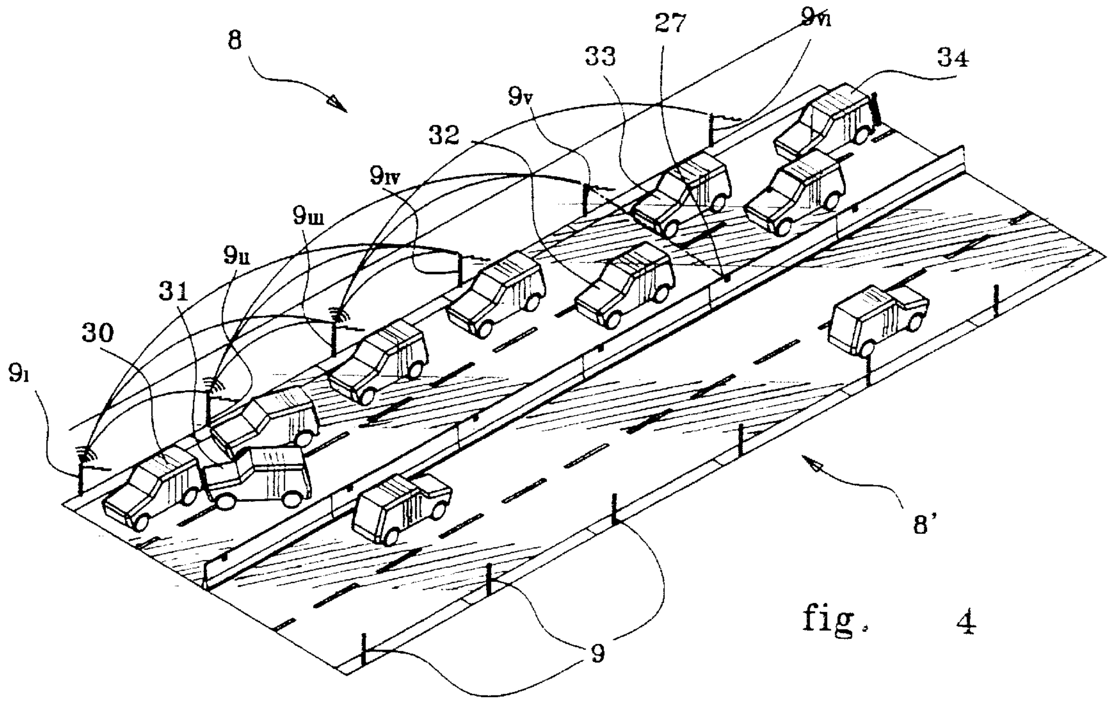
FIG. 4 is a schematic perspective view of a portion of a motorway equipped with the system according to the invention.

As seen in FIG. 1, control plant 11, which is included in an envelope shaped preferably like a curbstone 12 having a vertical extent (FIGS. 2 and 3), comprises substantially a car sensor for detecting the presence of cars, which is normally formed by an emitting unit 13 and a receiving unit 14 of electromagnetic, luminous, sound or like signals (i.e. a photoelectric cell, a radar, a laser unit etc.) adapted to detect the presence of motor-cars between the emitting unit 13 and a possible bounce screen 28 situated along the road opposite receiving unit 14, or also to detect a reduction of the free spaces in front of the motor-vehicles (FIG. 4). These sensors have a very low hysteresis and therefor are able to reset themselves in a very short time in the event of heavy traffic, since between the passage of a car and a subsequent one there exists an interval which will be called a blank interval, namely without traffic, in which the sensor does not detect obstacles and stops transmitting signals and resets itself, namely zeroizes its function.

The control plant also comprises a timer unit 15 acting as a filter adapted to receive all the signals coming from the sensor and lets pass only a signal coming from the sensor of continuous type and longer than a pre-established time, for example 5 sec. In turn, timer unit 15 is interfaced with a component part acting as a general control and managing central unit 16. Such general control and managing central unit 16, when the signal coming from the units 13, 14 and 15 arrives, activates the optical alarm device 17 which is constituted for example by a yellow blinking lamp suitable for fog, and which emits a luminous beam in the direction of the oncoming motor-cars. A possible sound alarm device 18 informs the nearby car drivers that the system is operating. The central control unit 16 is additionally connected to radio-transmitter and receiver units, in the example constituted by four radio units 19, 20, 21 and 22, of which the units 19, 20 are constituted by a radio-transmitter unit respectively with low and high range of diffusion and the units 21 and 22 are constituted by radio-receiver units all provided with suitable antennae and respectively with high and low range of diffusion. In particular, in the case of a traffic jam detected by the traffic presence sensor, the central control unit 16 will receive such traffic jam information through the sensor and the timer unit 15, and in response will generate a corresponding control signal which will be transmitted to the radio-transmitter unit 19, which transmits an electromagnetic signal with low (namely limited) range of diffusion (for example 200 m), which is received by the next detecting units 10 in the manner and with the consequences which will be described. In turn, the radio-receiver unit 22 has the object, when a signal coming from other detecting units 10 arrives, to transmit an impulse to the general control central unit 16, which activates the optical alarm device 17 connected thereto, in which condition such optical alarm device 17 is therefore activated only upon receipt of the radio signal and not the signals coming from the traffic presence sensors. Moreover, in this case the central unit 16 does not provide to generate radio signals and sound alarm signals, except in the condition, for example in the tunnel, which will be considered later on.

Consequently, all the optical alarm devices of the system are activated (in the example in the 200 m. range), whose radio receiver units 22 are syntonized on the frequency of the radio-transmitter units 19, and therefore it is determined that a dangerous situation exists for the drivers passing in the same running direction. This is made possible also by the fact that all the radio units are provided with a band selector, not shown, and in particular the radio units 19 and 22 operate with at least two different radio frequencies, which are utilized for the two different running directions of the same roadway.

In the case in which the control system according to the invention is arranged inside tunnels, in order to avoid a traffic jam inside such tunnels, it is necessary that the emergency luminous signal reaches not only the detecting units situated in the neighborhood (namely 200 m. as stated previously) but also other detecting units which are placed at the tunnel inlet, thereby avoiding the danger that additional cars enter the same tunnel when it is already jammed. To this purpose, the central unit 16 comprises a selector, not shown, which is operable in the case of arrangement of detecting units inside tunnels, which is adapted to determine, in the case in which it receives a radio signal from a further detecting unit, not only the activation of the optical alarm device, but also the emission of the radio signal with the radio-transmitter unit 19, so as to diffuse such signal up to the desired distance. The detecting units disposed inside tunnels are supplied directly by the electric circuit included therein, through adequate adapter circuits.

In the case in which the central unit 16 receives a signal through the sensor and unit 15, such central unit causes the radio-transmitter unit 20 to emit a radio signal with long range of diffusion, which is syntonized with the official road checking boards provided by the police, automobile club, etc., thereby informing them of the emergency condition which has been determined. These official road checking boards can transmit a pre-established radio signal to the radio-receiver units 21 which, upon recognizing such signal, interact with the central unit 16 to interrupt the emission of the signal by the unit 20.

The central unit 16 is also connected with an outer control unit such as a selector 23, which can be accessed from the outside by means of skilled personnel and suitable means, and said selector has the function either to activate or de-activate the relative electronic control plant 11 in the case of failure thereof, or also to activate the control system for the distance respectively affected, for example in the case of work being carried out. Such selector can be constituted also by a remote control which is active on the central unit 16, performing the same function of the same selector.

In addition, control plant 11 is provided preferably with an autonomous supply voltage unit composed for example of a photosensitive cell panel 24 which, by interacting with a storage battery charge control unit 25, which is connected thereto, guarantees a steady maximum charge to the supply batteries 26 included in the control plant, thereby keeping the detecting unit 10 always under voltage. Furthermore, such control plant 11 may be supplied also from outer and separate electric supply voltages. When the signals coming from the sensor and the units 15 and 22 have ceased, when the car jamming situation has been eliminated, the central unit 16 of each control plant resets itself, and arranges itself again to perform the function of traffic watch.

Figure 2:
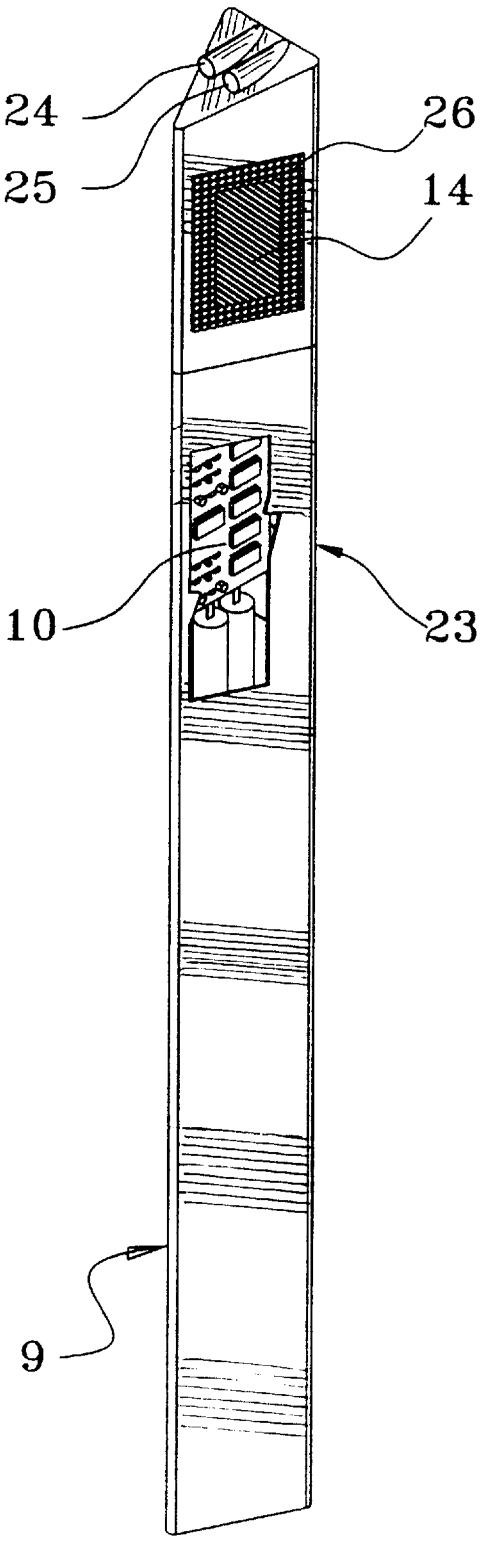
FIG. 2 is a perspective view of the front part of a unit included in the present traffic control system.

In the FIGS. 2 and 3 it can be seen a possible embodiment of the detecting unit 10, in each one of which the electronic assembly composing the control plant 11 is housed, wherein the receiving unit 14 and the emitting unit 13 are housed on the curbstone upper part, turned toward the road, at such a position as to be able to check the area in front thereof, while the blinking light or the optical alarm device 17, possibly paired with the reflex reflector 26', are housed on the part of the curbstone turned toward the oncoming cars. The sound alarm unit 18 can be housed inside the curbstone envelope 27.

As seen in FIG. 3, the safety selector 23 and the photosensitive cell panel 24 are housed on the back side of the envelope 27, while also a lid (not shown) is provided, permitting access therein before arranging the detecting unit 10 in a definitive manner so as to select the radio frequencies to be used in the control system and in particular for selecting the signal used for a specific car running direction and for the possible return of the possible existing radio signal in the case in which the system is arranged inside tunnels.

In FIG. 4 can be seen a portion of control system 8 during an alarm condition signal (road with running direction right to left) and a portion of control system 8' during a normal signal (road with running direction left to right), and in this case such systems are provided operating with infrared sensors by way of non-limiting example only. FIG. 4 shows only a control system portion, which can be constituted by at least two and also further detecting units 10 which are installed and formed as described previously, which are positioned spaced more or less regularly along the road, and have the emitting units 13 and the receiving units 14 turned toward the road center. On the opposite side of the road there are placed the reflecting or bouncing screens which, in the case of absence of obstacles, return the signal coming from the emitting unit 13 back to the receiving unit 24, while they do not return such signal in the case of the presence of an obstacle, in which case after the pre-established time of some seconds have elapsed the alarm signal is activated. Therefore, if for example cars 29 and 30 have an accident so as to form an obstacle situated in a position coinciding with control unit 10' with the relative sensor 13, this latter as soon as the pre-established time has lapsed (for example 5 sec.) starts the process as follows: voltage supply of the associated blinker 17, the associated sound alarm device 18 and emission of radio signals from the relative transmitting unit 19, which causes all the optical alarm devices provided on the operation range of such emitting unit to be activated, which devices are represented in the drawing by control units 10'', 10''', 10*v*, which are syntonized on the same frequency and concern only the running direction on which the obstruction has happened. In the other running direction the traffic is normal. When a queue is formed, control units 10', 10''' etc. will be activated by signalling to the arriving cars progressively and timely in advance the alarm condition corresponding to the column of cars which are stopped. A possible control unit, such for example as unit 10*v*, which might not signal the jamming condition since it is not operating among standing motor-vehicles or since it is not operating due to a failure, will not prejudice excessively the system since in such case its function will be performed by the subsequent control unit, indicated with the number 10*v* in our example, which unit therefore will timely signal the danger situation to arriving car 33, which will be able to timely brake.

Finally, thanks to the fact of being able to be interfaced through the receiving units 22 and the transmitting units 20 with the checking boards such as provided by the police and automobile clubs, etc. and to be able to be identified on sets, the control system 8 can be activated per unit sets by these checking boards such for example in the case of dense fog, in a manner to let the blinkers 14 perform not only the deterrent function but also the function of making visible the road references such as the side of the road or shoulder.

What is claimed is:

1. A traffic control system for timely signalling the presence of an obstruction on a roadway which includes a plurality of vehicle detecting units (10) powered by an electric supply voltage spaced along said roadway, each vehicle detecting unit including a control plant (11) comprising:

a) means for sensing the presence of motor vehicles including a signal emitting unit (13) and a signal receiving unit (14);

b) timer means for receiving signals from said sensing means indicating the presence of motor vehicles and for filtering said signals so as to pass only signals longer than a pre-established time;

c) a central control unit (16) interfaced with said timer means to receive the signals passed by said timer means;

d) alarm means (17,18) communicating with said central control unit (16) and actuated thereby upon receipt by said central control unit of a signal from said timer means;

e) radio transmitter units (19,20) activated by said central control unit (16) upon receipt by said central control unit of a signal from said timer means to transmit a signal to adjacent detecting units which activates through a respective central control means associated with said adjacent detecting units alarm means of said adjacent detecting units; and f) radio receiver units (21,22) operatively communicating with said central control unit (16) for receiving signals from adjacent detecting units to activate said alarm means (17,18).

2. The control system according to claim 1, wherein said control plant (11) is housed in an envelope (27) shaped as a curbstone (12) having a vertical extent.

3. The control system according to claim 1, wherein said sensor means (13,14) have a very low hysteresis and cease transmitting signals when obstacles on the roadway are not detected.

4. The control system according to claim 1, wherein said central control unit further includes selector means, which can be operated when said detecting units (10) are disposed inside tunnels, and which are adapted to activate said alarm means (17,18), said radio transmitter units (19,20) and said radio receiver units (21,22).

5. The control system according to claim 1, wherein said central control unit (16) is connected to an outer control selector (23), which can be operated by means of skilled personnel and suitable means or also by remote control, so as to activate or deactivate the relative control plant (11) in the case of failure thereof, or also to activate the control system solely for the affected distance for example in the case of works being carried out.

6. The control system according to claim 1, wherein said alarm means comprises an optical alarm device (17) and a sound alarm device (18).

7. The control system according to claim 1, wherein said control plant (11) is supplied by said electric supply voltage in the form of a battery (26) through a charge control unit (25) and a photosensitive cell panel (24).

8. The control system according to claim 1 wherein said electric supply voltage is separate from said control plant (11).

9. The control system according to claim 1, wherein the signals of said signal emitting unit and said signal receiving unit are electromagnetic, luminous or sound signals.

* * * * *